United States Patent [19]

Nakano

[11] Patent Number: 4,918,596
[45] Date of Patent: Apr. 17, 1990

[54] HIERARCHICAL INFORMATION PROCESSING SYSTEM

[76] Inventor: Akira Nakano, 13-13, Mita 2-Chome, Meguro-Ku, Tokyo-To, Japan

[21] Appl. No.: 880,722

[22] Filed: Jul. 1, 1986

[30] Foreign Application Priority Data

Jul. 1, 1985 [JP] Japan .................................. 60-144285

[51] Int. Cl.⁴ .......................... G06F 15/16; G06F 9/40
[52] U.S. Cl. ..................................... 364/200; 364/230; 364/230.3; 364/230.4; 364/229.1
[58] Field of Search ................. 364/200, 200 MS File, 364/900 MS File

[56] References Cited

U.S. PATENT DOCUMENTS

| | | | |
|---|---|---|---|
| 3,970,993 | 6/1976 | Finnila et al. | 364/200 |
| 4,096,566 | 6/1978 | Borie et al. | 364/200 |
| 4,462,075 | 7/1984 | Mori et al. | 364/200 |
| 4,466,064 | 8/1984 | Martin | 364/200 |
| 4,470,113 | 9/1984 | Oura | 364/200 |
| 4,720,780 | 1/1988 | Dolecek | 364/200 |

Primary Examiner—Gareth D. Shaw
Assistant Examiner—Paul Kulik
Attorney, Agent, or Firm—Michael N. Meller

[57] ABSTRACT

An information processing unit comprises an external input for acquiring the intention of a user as external process specifying information and data to be processed as source information; downward input for acquiring the intention of the user as inter-unit process specifying information via another unit of the same constitution as an upper unit for sending the inter-unit process specifying information; an upward input for acquiring the results of the processing outside of the unit as input of inter-unit processed information via at least one unit of the same constitution as a lower unit for sending the inter-unit processed information; processing device for re-composing the external process specifying information and/or the inter-unit process specifying information into process specifying information for own unit and inter-unit process specifying information for the lower unit and for executing the processing utilizing the source information and/or the inter-unit processed information according to the process specifying information for own unit; an external output for sending a whole or a part of the result of the processing by the processing device; an upward output for sending a part or a whole of the result of the processing by the processing device to the upper unit as output of inter-unit processed information; and a downward output for sending the inter-unit process specifying information re-composed by the processing device to the lower unit. By assembling the information processing units, an information processing system to be expanded or re-composed easily can be realized.

6 Claims, 5 Drawing Sheets

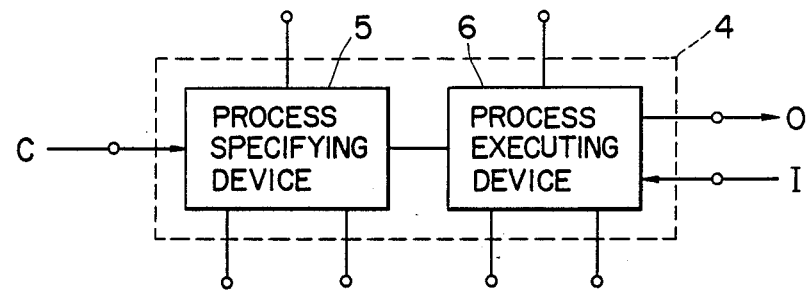
F I G. 3
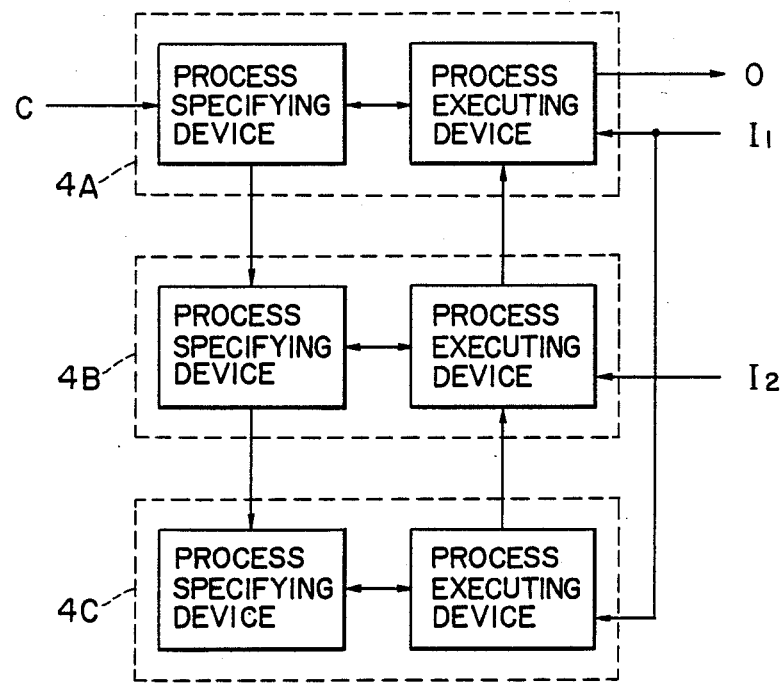
F I G. 4

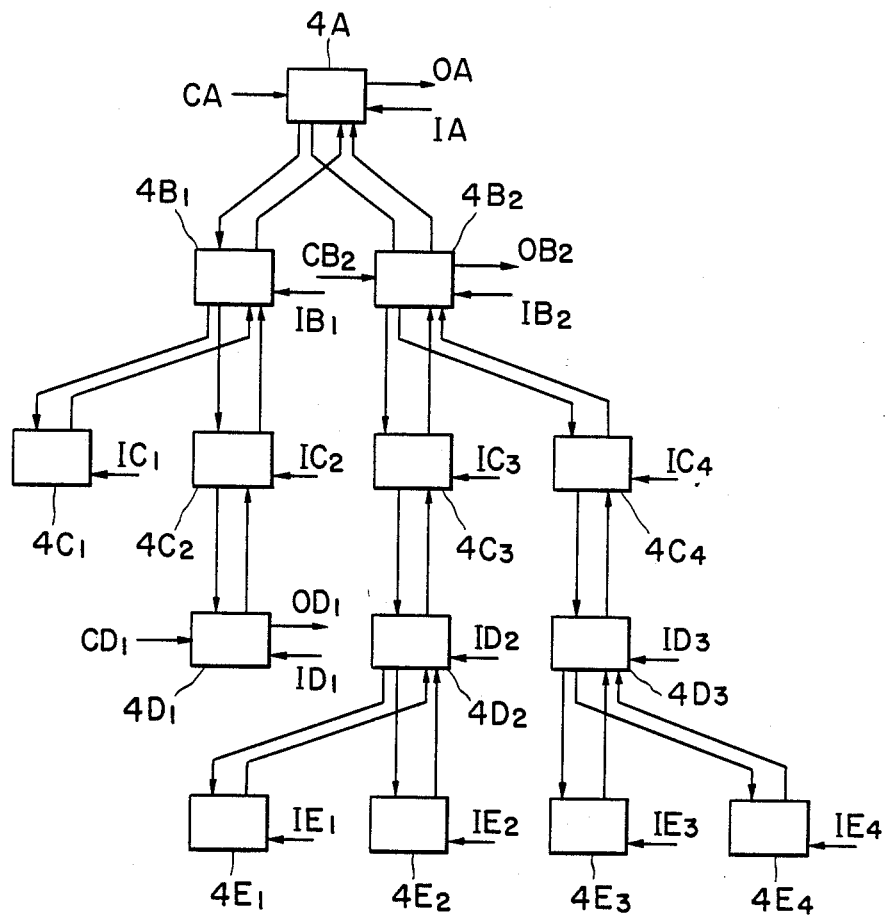
FIG. 8
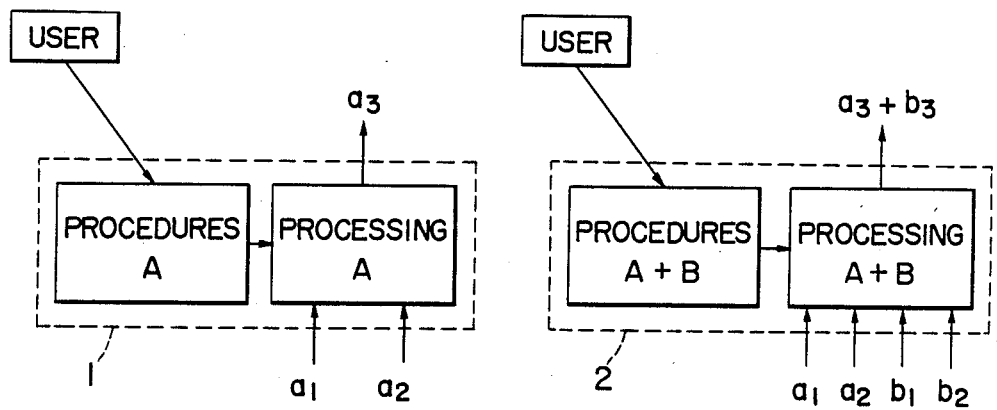
FIG. 9
PRIOR ART
FIG. 10
PRIOR ART

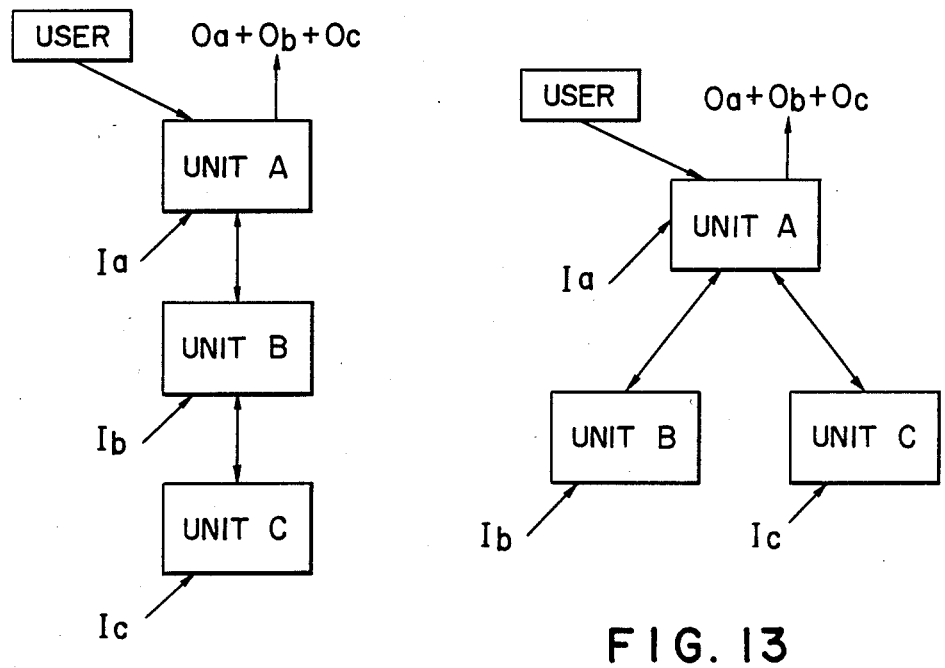
F I G. 12
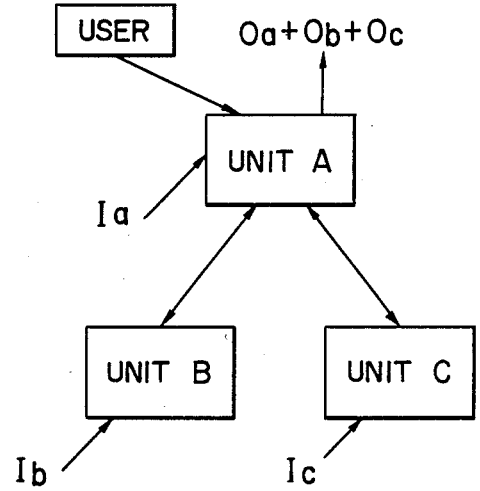
F I G. 13

4,918,596

HIERARCHICAL INFORMATION PROCESSING SYSTEM

BACKGROUND OF THE INVENTION

This invention relates to a hierarchy type information processing system comprising multiple units, where the units can work as "stand-alone" information processing systems respectively when separated from their parent system. In the same manner the parent system can act as an element of another larger system.

In the field of information processing, recently it is frequently necessary to many users to replace or reconstruct their processing systems.

FIG. 9 shows a prior art processing system 1, where a procedure A arranged according to a user's intention executes the processing A which acquires inputs $a_1$ and $a_2$, then processes them and finally reduces them to an output $a_3$.

Here suppose a situation where an amount of input data is increased, and the system is not able to process it in a pre-determined time.

FIG. 10 shows a replacement of the system 1 by a system 2, where a procedure A+B executes a processing A+B which processes input data $a_1$, $a_2$, $b_1$ and $b_2$ and then outputs $a_3+b_3$. The system 1 in FIG. 9 cannot be used in the system 2 of this case as a unit.

FIG. 11 shows a case wherein a system 3 is added to the system 1 for increased processing. In the system 3, for an added processing B, procedure B is provided. Thus the former systems can be utilized perfectly as units of the system 3, and the system 3 works similarly to the system 2 in FIG. 10. But in accordance with the architecture of the present technology some extra devices such as α and β are required to distribute the user's intention to both units and to synthesize the outputs from both units. Therefore the system improvement by multi-units idea is not so simple.

Because the construction of more complex systems by this multi-unit idea may require additional devices and efforts, it is that one impractical that one to increase processing load by adding the units unlimitedly.

SUMMARY OF THE INVENTION

An object of the invention is to provide an information processing unit having easily expandable characteristics by which a huge system can be constructed with simple structure.

Another object is to provide a hierarchy type information processing system composed of multiple units of the above-mentioned type in which various jobs could be executed concurrently in respective groups of units whether they are coupled to each other or not, and such a formation of groups and coupling are easily recomposed occasionally.

In order to achieve the above-described objects, this invention provides an information processing unit which comprises:

(a) external (user available) input means which acquire the user's intention as "external process specifying information" and the data to be processed as "source information";

(b) external (user available) output means which output the result of the processing as "external processed information" to an external device such as a CRT;

(c) downward input means which accept the specifying information from an upper unit as on input of "inter-unit process specifying information";

(d) upward output means which send the processed information to an upper unit as an output of "inter-unit processed information";

(e) downward output means which send the specifying information to a lower unit as an output of "inter-unit process specifying information";

(f) upward input means which accept the processed information from a lower unit as an input of "inter-unit processed information";

(g) a process specifying device which distributes the load automatically, in other words, re-composes the external specifying information and/or inter-unit process specifying information into information for its own unit and that for lower units and sends the latter information to the lower units; and (h) a process executing device which carries out a proper operation assigned to its own unit.

This invention also provides a multi-unit information processing system which comprises a plurality of information processing units having the above-mentioned characteristics, which are connected mutually in a hierarchical structure, and in which the intention of a user diverges in the system by a downward stream of process specifying information and by an upward stream of processed information, and the results of local operations coverage to a final output.

BRIEF DESCRIPTION OF THE DRAWINGS

In the accompanying drawings:

FIG. 3 is a block diagram showing an embodiment of a single unit type information processing system according to this invention;

FIG. 4 is a block diagram showing an embodiment of a multi-unit information processing system according to this invention;

FIGS. 7 and 8 show examples of conceptual arrangements for building up a huge system by the multi-unit idea according to this invention;

FIGS. 9 through 11 show the general concept of the relationships between user's needs and prior art system design about information processing; and FIGS. 12 and 13 are conceptual diagrams of multi-unit information processing system.

DETAILED DESCRIPTION OF THE INVENTION

FIGS. 12 and 13 show fundamental ideas of this invention. The information processing system according to this invention is built up by connecting a plurality of units having similar characteristics with cables only. Load to the system is diverged automatically through the cables, results of operations in each unit also being converged through the cables.

FIG. 12 shows an example of the serial connection of the units, where three units A, B and C of similar design accept Ia, Ib and Ic as source information respectively.

In unit A, assigned work by a user is divided into work for its own unit and that for lower units (B and C). By the same function unit B divides the work given by unit A into work for its own unit and that for lower units (C only, in this case).

As mentioned above, a user's intention is distributed to all of the three units by a downward information stream.

Then the result of work is synthesized by an inverse stream, namely an upward information stream. In this stream, unit B has function to summarize the result of work in its own unit and that from a lower unit (unit C), and in the same way unit A summarizes the result of work in its own unit and that from a lower unit (B but including C's participation). Thus the user acquires total results 0a+0b+0c from unit A.

FIG. 13 shows an example of the parallel connection of the units, where unit A divides the work which is originated from a user's intention into the work for its own unit, that for unit B and that for unit C, and summarizes the result of work in its own unit, that in unit B and that in unit C. Thus unit A outputs the total results 0a+0b+0c.

According to the above mentioned philosophy, systems in any scale or of any function will be constructed effectively and system conversions may be carried out easily and flexibly.

Arrangement of Information Processing Unit

Figure 1:
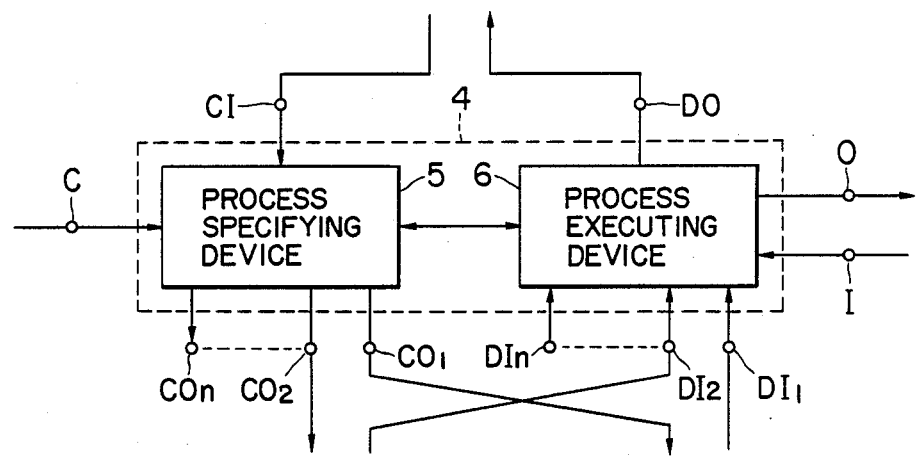
FIG. 1 is a block diagram showing an embodiment of an information processing unit according to this invention.

FIG. 1 shows an embodiment of an information processing unit according to this invention.

As indicated in the drawing, information processing unit 4 comprises a process specifying device 5 and a process executing device 6.

The process specifying device 5 comprises a first external input port C which acquires a user's intention as external process specifying information from the external device such as a keyboard (not shown here), and an upper input port CI which accepts inter-unit process specifying information from an upper unit (not shown here) and a plurality of lower output ports $CO_1$ through $CO_n$ which send the inter-unit process specifying information to lower units (not shown here).

The process executing device 6 comprises a second external input port I which acquires a source information to be processed from an external device such as a data recorder (not shown here), an external output port O which sends the result as external processed information to an external device such as a CRT (not shown here), an upper output port DO which sends the inter-unit processed information to an upper unit (not shown here) and a plurality of lower input ports $DI_1$ through $DI_n$ which accept the inter-unit processed information from lower units (not shown here). The arrow indication in FIG. 1 means that the intention for the work to be carried out in the system is originated from a user to be distributed to units successively along by a downward stream, and source informations are processed and summarized successively to be led to output devices along by an upward stream.

Here, the side where the source of process specifying is located is designated as "upper", and in the same manner the location of an output is considered to be "upper" against an input location of source information. And as a matter of course each stream may contain some inverted local flows against the arrowed directions.

Route for Process Specifying Information

Process specifying information corresponds to "commands" or "source program" in ordinary information processing systems and expresses the intention of a user concerning the work to be done by the system. All of input information is fed to the process specifying device 5.

By the route for external process specifying information the intention of a user is fed directly, and by another route, namely by the input route for inter-unit process specifying information, the intention of a user is provided indirectly via other process specifying devices in upper units.

And by the output route for inter-unit process specifying information, a part of the user's intention is transferred to another process specifying device 5 in a lower unit.

Generally, ports located on both sides, namely the upper input port CI and the lower output port CO, have the same specification. So the upper input port CI can be connected to a lower output port CO of another (upper) unit and the lower output port CO can be connected to an upper input port CI of another (lower) unit. But for the external input port C which has the same logical function as the other two kinds of ports, different physical specifications may be allowed.

Against the above-mentioned information routes, the process specifying device 5 can control the "on-off" status in the operation phase utilization of this function will be mentioned later.

Route for Processed Information

On the other hand, processed information including source information corresponds to input/output data in ordinary information processing systems, and for most of the units in the system, it is supposed to be an intermediate state of information passing on a path from source to final result which is expected by the user.

All input information is fed to the process executing device 6. Via the external input port, source information is fed directly and by the input route for inter-unit processed information, source informations which are accepted at lower locations and processed by other process executing devices 6 in lower units are fed.

Then by the output route for inter-unit processed information the result yielded by its own device, namely the summarized result of all operations at lower units including their own units, is transferred to another process executing device 6 in an upper unit. And/or the processed information at the status is available for the user via an external output port.

Similarly to the case of the process specifying device 5, ports located at both sides, namely a lower input port DI and an upper output port DO, have the same specification. So the lower input port DI can be connected to an upper output port DO of another (lower) unit, and the upper output port DO can be connected to a lower input port DI of another (upper) unit. Even though the external ports O and I have the same logical function as ports for inter-unit information, different physical specifications may be allowed for them.

Process Specifying Device

First, the process specifying device 5 receives the intention of the user via port CI and the information to specify the operation of the unit via port C and refers to information in the process executing device 6 if necessary, subsequently decides the procedures which will be executed in the process executing device 6, and finally sets up the process executing device 6 to perform the above-mentioned procedures properly.

But in the situation where the user's request exceeds the performance of the unit or necessitates not-installed function, the process specifying device 5 divides the required job into the job for its own unit and those for lower units, then the latter jobs are shifted to lower units via ports $CO_1 \sim CO_n$ as inter-unit process specifying information.

At the same time, the expected result from lower units, namely the expected contents of processed information, can be assumed, so the procedures for treating such input of processed information are included in those for process executing device 6.

The above-mentioned function is called the "automatic load distributing function" here. This automatic load distributing function is very useful for the system according to this invention, but in some structures of the system, this function is dispensable. For instance, as shown in FIG. 2, another system for load distributing is located externally, and each unit receives process specifying information corresponding to the work of its own unit only.

Figure 2A:
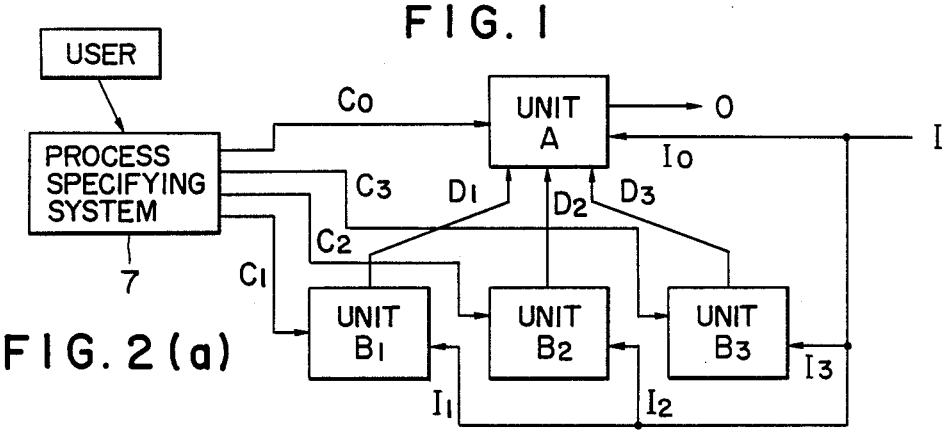
FIGS. 2(a) and 2(b) show basic concepts of the multi-unit information processing system according to this invention.

FIG. 2(a) shows a system of the parallel connection of the units, where the intention of a user is divided into respective process specifying information $C_0$, $C_1$, $C_2$ and $C_3$ in an external process specifying device 7 to be sent to four respective units. Units $B_1$, $B_2$ and $B_3$ receive the source information $I_1$, $I_2$ and $I_3$ respectively and after the operation transmit inter-unit processed information $D_1$, $D_2$ and $D_3$ respectively to unit A, then unit A summarizes those processed informations and source information $I_0$ according to the received process specifying information to finally transmit the result as external processed information 0 to an external device such as a CRT (not shown here).

Figure 2B:
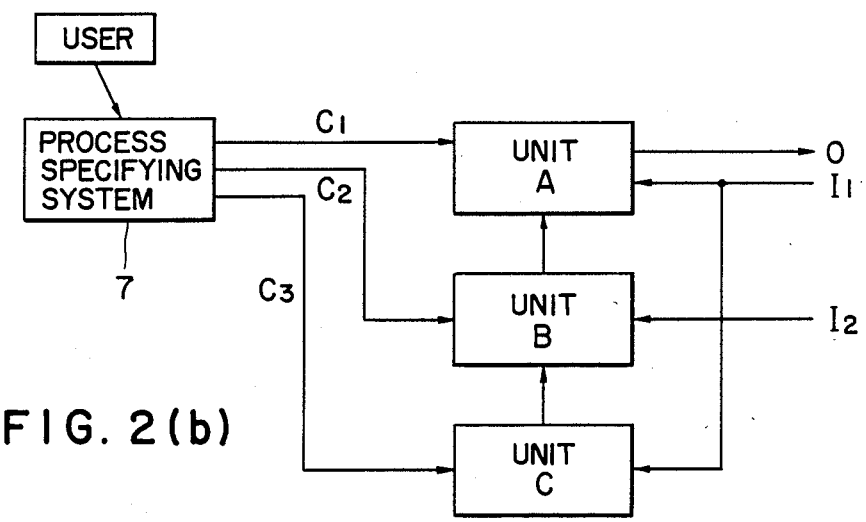

In the serially connected system shown in FIG. 2(b), load distribution is performed by the external process specifying device 7 in the same manner.

But it may be allowed that the structures shown in FIG. 2 are considered to be variations of the original idea where a portion for automatic load distributing function in the process specifying device 5 (FIG. 1) of each unit is separated from the device, and all of such portions are incorporated an external device.

Process Executing Device

In FIG. 1, according to the setting-up by the process specifying device 5, the process executing device 6 processes the inter-unit processed informations via ports $DI_1 \sim DI_n$ and source information via port I, and then transmits the result of processing to an upper unit through the port DO as inter-unit processed information and to an external device through the port O.

In the general processing, the device yields the result of the proper job which is assigned to the unit to which the device belongs, receives the results of jobs which are assigned to lower units, then summarizes them and finally yields the result of the job which corresponds to the whole of the process specifying information which is received by the process specifying device 5.

There are some variations of the above-mentioned "general processing".

A processing comprises a conversion of the inter-unit processed information only where source information is not utilized.

A processing comprises synthesizing only, where a plurality of inter-unit processed informations are summarized, but the proper job is not executed. Therefore source information is never utilized.

A processing by a lowest unit (without any unit on the lower side) comprises a proper job for its own unit only.

A processing with no input information may exist where the information which corresponds to source information is given to the unit as a part of process specifying information like fixed data. In this case, the process specifying device 5 must follow a change of the outer environment, so the device must receive the updated process specifying information to set up the process executing device 6 accordingly.

Unit Design

In designing the information processing unit 4, function and performance of the process specifying device 5 are arbitrary, and those of the process executing devices 6 are equally arbitrary.

As for the information routes, the number of ports for each category of the routes is arbitrary. The upper port CI must be connected to the lower port CO in another unit with cables and connectors directly, and the same relationship is required between the ports DI and DO. But all of these information routes are not always utilized.

Here some examples will be shown:

(1) Case of an uppermost unit in a system or a single unit system

The upper ports CI and DO are not utilized, but the external input port C is indispensable.

(2) Case of a lowest unit in a system or a single unit system

The lower ports CO's and DI's are not utilized, but external input port I is indispensable except for the case wherein process specifying information carries all data to be processed.

(3) Case of intermediate unit in a system

All kinds of upper and lower ports are utilized, but the utilization of the other ports depends on characters of expected processing. When injection of a user's intention is concentrated on an uppermost unit, only the ports C's are not utilized. When an assigned job is for synthesizing lower informations only, the port I is dispensable.

System Design

Two examples of system design are discussed hereinafter.

(1) Single unit system

FIG. 3 shows a single unit system where only one unit constitutes the system.

As shown here, upper and lower ports are open. The port C is connected to an external input device such as a keyboard (not shown here) to acquire a user's intention. The port O is connected to an external output device such as a CRT (not shown here).

Here the outer behavior of the system resembles that of the general information processing system in current technology except for the existence of unused ports for inter-unit connection, namely the potentiality for easy expandability.

(2) Multi-unit system

FIG. 4 shows a system which comprises three units arranged in tandem.

Here suppose that a unit of type 4A has function $F_1$ and performance $P_1$; type 4B, function $F_2$ and performance $P_2$; and type 4C, function $F_1$ and performance $P_3$.

When requirements of a user are performance $PF_1(=P_1+P_3)$ against function $F_1$, and performance $PF_2(=P_2)$ against function $F_2$, responding to those requirements, a maker delivers a system in which one unit of type 4A, one unit of type 4B and one unit of type 4C are installed, and they are connected serially to each other utilizing a port for each route.

As the route for a user's intention, the port C to unit 4A is provided and as the route to an external output device, the port O to unit 4A is provided.

For the source information which will be used to perform function F1, the port $I_1$ is installed, which is connected to external input ports on units 4A and 4C internally and to an "external input device—1" (not shown here) externally. In the same manner a port $I_2$ is installed to accept the source information for function $F_2$ from an "external input device—2" (not shown here) to unit 4B. All the units have the "automatic load distributing function".

If the system is assembled into a single package, a user may recognize it as a single unit system and cannot find any difference in outer behavior of this system and that of a single unit system.

Some examples of inner behavior at different loads will be explained hereinafter.

(2)-1 {load for function $F_1$}$<P_1$, {load for function $F_2$}$=0$

The whole operation is executed in unit 4A. Units 4B and 4C are always in the idle state. Unit 4A processes source information via the port $I_1$ and sends the result to the port O without any communication to lower units.

(2)-2 $P_1<$ {load for function $F_1=P_1+\alpha$}$\leq 2P_1$, {load for function $F_2$}$=0$ STEP-1: The process specifying device in unit 4A sets up the process executing device in the same unit to execute the work which corresponds to maximum performance $P_1$ by its own device, to receive the results of work which corresponds to load $\alpha$ from unit 4B and to output the complete result of an assigned work corresponding to the total load $P_1+\alpha$ to the port O. Then the device transfers the process specifying information which requires the work of function $F_1$ whose load is $\alpha$ to unit 4B.

STEP-2: The given process specifying information does not include any requirement for function $F_2$. Therefore the process specifying device in unit 4B sets up the process executing device in the same unit to pass the inter-unit processed information from unit 4C to unit 4A. Then the process specifying information is transferred to unit 4C without modification.

STEP-3: The content of the given process specifying information to unit 4C match with the function and performance of this unit, then the process specifying device sets up the process executing device to perform the given job.

STEP-4: The process executing device in unit 4C acquires source information via the port I and after processing transmits the result to unit 4B.

STEP-5: The process executing device in unit 4B passes the inter-unit processed information from unit 4C to unit 4A.

STEP-6: The process executing device in unit 4A receives source information via port $I_1$ and processes it according to the appointed specification after arrival of the inter-unit processed information from unit 4B, the summarizing operation is performed, then the final result is transmitted via port O.

(2)-3 {load for function $F_1$}$<P_1$, {load for function $F_2$}$<P_2$

STEP-1: The process specifying device in unit 4A sets up the process executing device in the same unit to carry out the whole work of function $F_1$, and to combine the information for the lower input port which is expected to be the result of operation for function $F_2$. Then the device transfers the process specifying information about function $F_2$ to unit 4B.

STEP-2: Because the given process specifying information matches with the function and performance, the process specifying device in unit 4B sets up the process executing device to perform the given job.

STEP-3: Unit 4C receives no information from the upper unit, so it stays in the idle state throughout the operation.

STEP-4: The process executing device in unit 4B acquires source information via the port $I_2$ and after processing transmits the result to unit 4A.

STEP-5: The process executing device in unit 4A receives source information via the port $I_1$ and processes it according to an appointed specification, and after arrival of the inter-unit processed information from unit 4B, the summarizing operation is performed, and then the final result is transmitted via the port O.

(2)-4 A case where load balancing operation is made on the above mentioned (2)-2 case.

Suppose a situation that at STEP-6 in the (2)-2 case, the result from the lower units arrives before completion of its own proper job, which means that the loads on its own unit and those on lower ones are out of balance.

Accordingly, at a next cycle unit 4A may shift a part of its own work to a lower unit.

For the application in which the same processing is repeated, after such a load balancing operation in trial and error, the most desirable distribution of load may be realized to attain the fastest processing speed.

System with Multi-Controls

The information processing unit shown in FIG. 1 may constitute a multi-control system.

By the philosophy of this invention, any huge system of a desired size may be realized by adding units to attain the requirement.

But in the examples which have been described, the user's intention is sent to an uppermost unit in a system concentratedly. Therefore, if the system necessitates increased specifying information proportionate to its size, a load on the route for such information may be considerable.

On the other hand, such a considerable increase of information may not arise on the route of processed information. This is because the source informations are received at a plurality of units and each unit does not bundle the results of a plurality of units but merely summarizes them to yield a complete result for the system.

Therefore, by providing several inputs for the external process specifying information at intermediate units, a huge system according to this invention may be realized without bottlenecks.

In such a decentralization system a practical size of process specifying information is expected, but some kind of information such as that for timing or for allowance of local control must be issued by the main (uppermost) unit. For the purpose of this kind of operation, namely flexible formation of sub-systems, the aforementioned "on-off" control function for process specifying information routes which is carried out by the process specifying device in the units is quite useful.

Even in the case of such a decentralized system, the fundamental characteristics of this invention, namely the characteristics that the nominal performance of a system is nearly equivalent to the total of individual performances, is maintained. Only the existence of a plurality of external input ports for process specifying characterizes the system.

Electronic Painting System

Next, another embodiment of a multi-unit information processing system according to this invention will be explained.

Here, "electronic painting system" means a system built up by the philosophy of this invention which carries out some operations equivalent to that by a complex system comprising computers and a graphic display device of the current technology.

First of all, an electronic painting system must possess the characteristics as a unit of the information processing system according to this invention, and be able to integrate a product of other systems to produce a synthesized result which makes one assume that a whole work is executed in this system. Therefore the output signals (processed information) and input signals from other systems must have the same format.

In an embodiment, the processed information consists of sequentially transmitted data at scanning points and synchronizes the scanning of a CRT for visualization of data.

Each data for one scanning point comprises flag data which indicates whether a pattern exists there or not, and, if a pattern exists, data for priority of the pattern and intensity of the displayed dots.

The system receives the above-mentioned data from other (lower) systems, processes the graphic data for its own system, then produces data on a scanning point which has the same specification as received data, and compares the priority data of its own product and the received one. If the former is prior to the latter, the produced data by its own system replaces the received data and is sent to an output port, but if not, the received data passes through the system. Accordingly the output of processed information has the same specification as the input of processed information and shows a synthesized result of its own system and other (lower) systems.

Thus the electronic painting system is realized by adopting such kind of processed information which has the above-described specification. There is no problem in another information system for process specifying because the process specifying information can be communicated with other systems by any digital bus.

Figure 5:
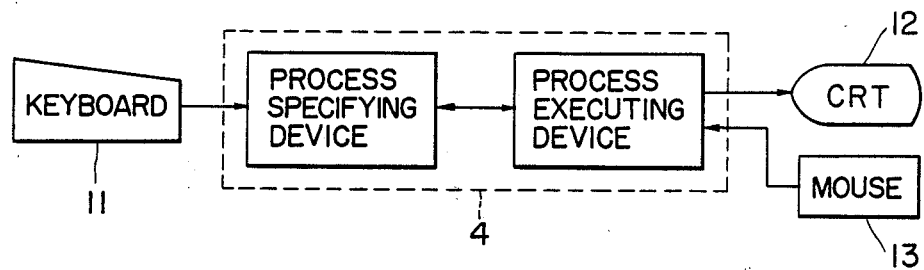
FIG. 5 is a block diagram showing an embodiment of a single unit type electronic painting system according to this invention.

FIG. 5 shows a single unit system for real time animation displaying, which comprises a unit 4, keyboard 11 for inputting external specifying information, CRT 12 for visualizing processed information and for inputting source information which is the source of the change of picture, and a data input device such as a graphic digitizer, joystick or mouse (for example, mouse 13).

Data for picture design, namely outline data, priority data and intensity data for each pattern are given by the keyboard 11, and they include some assignment about the correspondence between moving items of the picture and those of the external source. As the process specifying device sets up the process executing device according to the information from the keyboard 11, a displayed picture changes following changes of the source information.

Next, consider the treatment of transparent patterns mixed with non-transparent patterns whose treatment was described previously. When a unit treats a transparent pattern which is prior to the pattern of the highest priority among what are processed in lower units, the received intensity data is modified according to a degree of transparency, and the priority data is not changed.

Effects of other transparent patterns in upper units will be applied properly in the same way, but for non-transparent patterns in upper units processing will not be carried out properly. So the processing unit for the transparent pattern must be arranged higher than that for the last non-transparent pattern.

Figure 6:
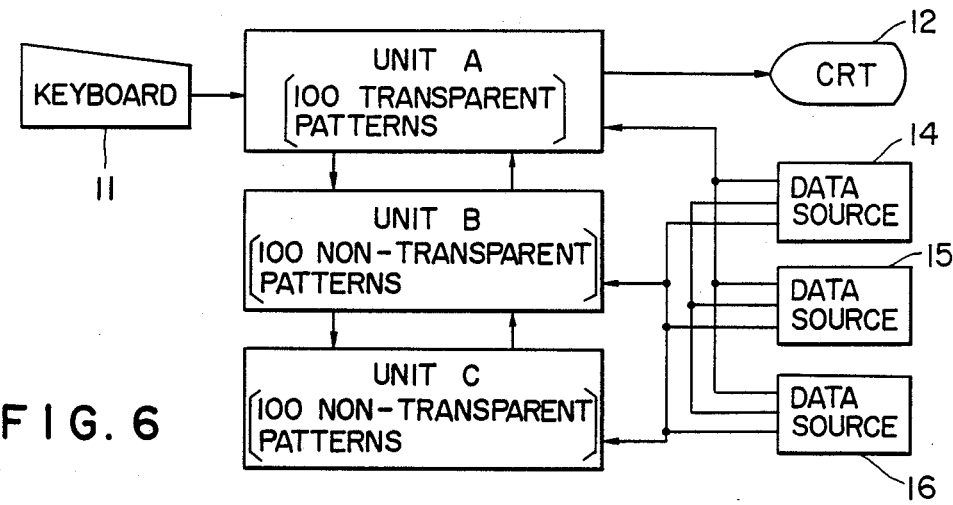
FIG. 6 is a block diagram showing an embodiment of a multi-unit type electronic painting system according to this invention.

FIG. 6 shows a system for mixed operation of transparent and non-transparent figures where three units are arranged in tandem. Unit A can handle 100 transparent patterns in real-time, namely function is "processing of transparent pattern" and performance is "100 patterns in real-time". Units B and C can handle 100 non-transparent patterns respectively; keyboard 11 and CRT 12 are connected to the uppermost unit (unit A). As for source information, there are provided three devices 14, 15 and 16, and each unit can select any device arbitrarily. Furthermore, the automatic load distributing function is provided also.

(1) Requirement is to display 150 non-transparent patterns.

STEP-1: The process specifying information, namely the display requirement, to unit A contains no treatment of transparent patterns, so the process specifying device sends all of the information to unit B and sets up the process executing device in unit A to pass the processed information from unit B through this unit.

STEP-2: The process specifying device in unit B takes data of 100 non-transparent patterns into its own device and sends the rest (50 patterns) to unit C and sets up the process executing device in unit B to process those data of 100 patterns and to integrate the result from unit C.

STEP-3: The process specifying device in unit C sets up the process executing device in unit C to process all the data of 50 patterns.

STEP-4: The process executing device in unit C processes data of 50 non-transparent patterns, then transmits the result to unit B.

STEP-5: The process executing device in unit B processes given data of 100 non-transparent patterns, decides whether any pattern exists on the present scanning point or not and if a pattern exists, selects data of the highest priority among them. After that it compares both its own the priority data and that received from unit C at the same point and data of higher priority is sent to unit A.

STEP-6: The process executing device in unit A passes the data from unit B and then outputs it to a CRT.

(2) Requirement is to display 50 transparent patterns and 80 non-transparent patterns.

STEP-1: The process specifying device in unit A takes all data of transparent patterns and sets up process executing device in the unit to process that data. And all data of non-transparent patterns are transferred to unit B.

STEP-2: The process specifying device in unit B sets up the process executing device in unit B to process all data of 80 patterns.

STEP-3: Unit C stays in the idle state throughout the operation.

STEP-4: The process executing device in unit B processes given data, then transmits the result to unit A.

STEP-5: The process executing device in unit A processes data of transparent patterns, compares data produced by its own device and by unit B at the same scanning point, applies the effects of patterns which are located in higher priority levels than the pattern belonging to the received data from unit B, and then finally outputs data to be visualized by the CRT.

Other Examples of Embodiment

It is a matter of course that the embodiments of a multi-unit information processing system according to the invention is not limited to the processing of the above-described category.

Figure 7:
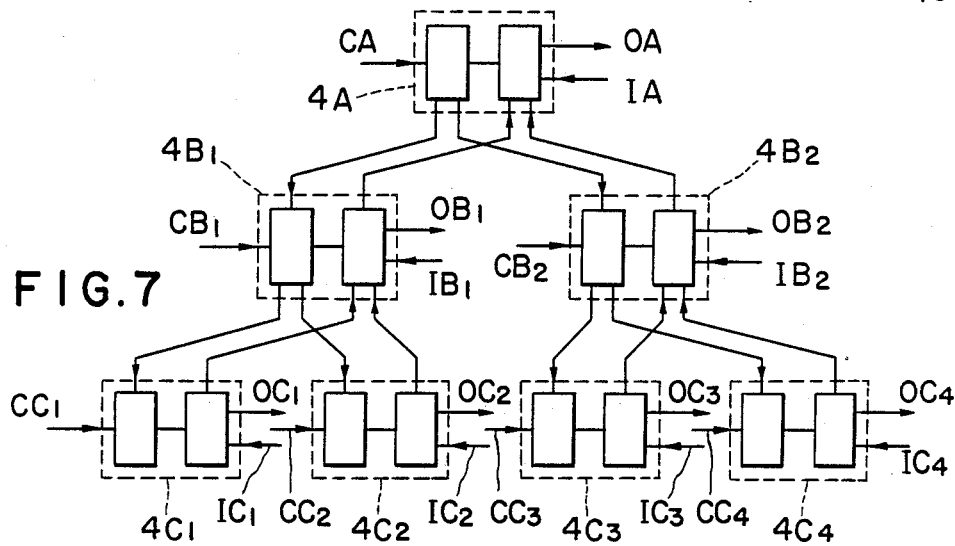
Figure 11:
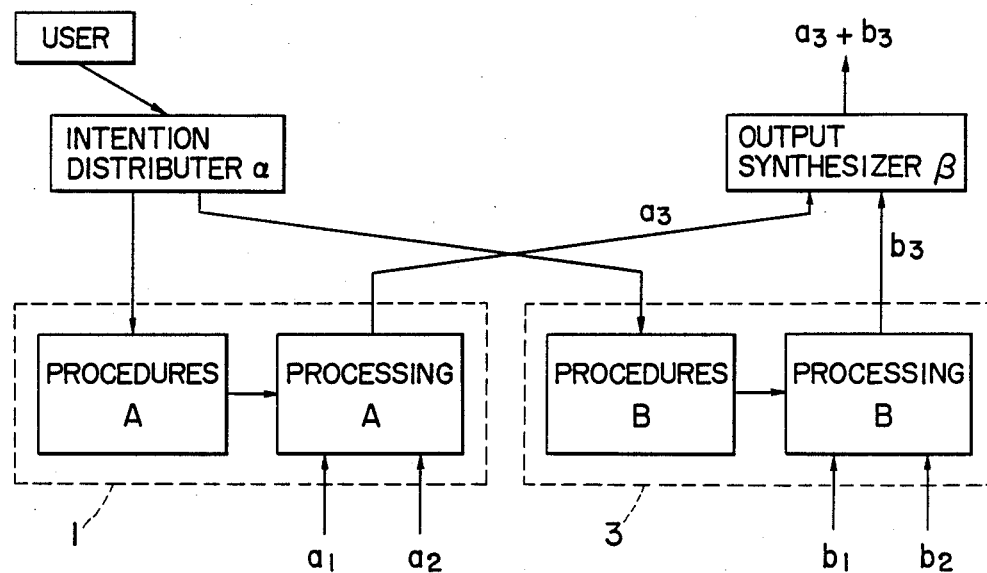

As for arranging methods, FIG. 7 shows a system composed of seven units and forms a three-tiered structure where each unit may utilize its external input/output function respectively. And this system may be extended to an n-tier structure easily to realize a huge system.

FIG. 8 shows another system composed of 14 units and the system forms a five-tier of structure where unit 4B$_2$ and 4D$_1$ have external input ports for partial control of the system. This is an example of a decentralized system.

So far, the realization of the system according to the invention starts from an operation which modifies a system of existing design to possess the function as a unit of information processing system according to this invention. Then the system is gradually extended by adding the units of necessary number and functions.

Now, if we proceed in the reverse direction, the unit may be divided into a plurality of smaller units. At the end of such division an element to execute some basic procedures of interest may be obtained and may be manufactured by VLSI technology as the smallest unit for a maker.

As described in several examples according to the invention, easy expandability enables users to follow occasional changes of needs rapidly. On the other hand, the multi-unit idea of the invention enables makers deliver a system which matches to user requirements in a shorter time.

As already mentioned, the automatic load distribution is a useful concept to utilize a multi-unit system according to the invention. Easy expandability of the system is the result of "statical" utilization of the concept; if the concept is used dynamically, the system can manage itself flexibly against the change of environment, such as the changes of the externally applied processing load or local down of the system.

Effects of the Invention

By assembling information processing units according to this invention, an information processing system can be quite easily expanded or re-composed, because of the capability called the "automatic load distributing function", which divides given process specifying information originated from the user's intention into process specifying information for the unit itself and that for lower units, summarizes the result of work performed by its own device and that by lower units and outputs the summarized result to an upper unit or to an external device.

Furthermore according to this invention, a multi-unit information processing system which fulfills any needs of users properly is also realized.

What is claimed is:

1. An information processing unit comprising;
   (a) at least one downward input means for acquiring process specifying information;
   (b) material input means for acquiring material information to be processed;
   (c) at least one upward input means for acquiring external result information which is generated by an external information processing system;
   (d) a processing device comprising: means for re-composing said process specifying information into and then outputting
      1. "self specifier" information corresponding to a job for said unit within a predetermined performance of the device,
      2. "others specifier" information corresponding to an excess job to be executed by said external information processing system, and
      3. "output specifier" information for combining results of execution in accordance with said "self specifier" and "others specifier" information to form processed information;
   said re-composing means being controlled independently of the contents of said process specifying information;
   means for generating internal result information in accordance with said "self specifier" information received directly from said re-composing means by processing said material information received directly from said material input means; and means for generating processed information in accordance with said "output specifier" information by processing internal result information and external result information which is the result of execution in accordance with said "others specifier" information;
   (e) at least one downward output means for sending said "others specifier" information to said external information processing system; and
   (f) at least one upward output means for sending said processed information.

2. An information processing unit according to claim 1, wherein said re-composing means comprises a process specifying device, said process specifying device being connected to said downward input means and said downward output means, and wherein said generating means comprise a process executing device, said process executing device being connected to said upward input means, said material input means and said upward output means, and said process specifying device being connected to send said "self specifier" information and said "output specifier" information to said process executing device.

3. A multi-unit information processing system having a multi-level hierarchical structure comprising at least one sub-structure of two levels, wherein said sub-structure comprises a first upper unit which serves as master, a first lower unit which serves as slave, and a first inter-unit connecting means connected to said first lower unit, each of said units comprising a unit as defined in claim 1, and said inter-unit connecting means comprising:
- (a) one downward interconnecting means for connecting said downward output means which belongs to said first upper unit and said downward input means which belongs to said first lower unit, whereby said "others specifier" information derived by said first upper unit is transmitted as said process specifying information for said first lower unit and
- (b) one upward interconnecting means for connecting said upward input means which belongs to said first upper unit and said upward output means which belongs to said first lower unit, whereby said processed information derived by said first lower unit is transmitted as external result information for said first upper unit, wherein said processing devices of said first upper and first lower units:
- (a) re-compose said process specifying information for said first upper unit into the following:
  - (1) a set of "self specifier" information corresponding to jobs for said first upper and first lower units in said substructure within a predetermined performance of said respective devices,
  - (2) "others specifier" information derived by said first lower unit for an excess job to be executed external to said sub-structure, and
  - (3) a set of "output specifier" information for combining the results of execution in accordance with said set of "self specifier" and said "others specifier" information to form processed information;
- (b) generate a set of internal result information in accordance with said set of "self specifier" information by processing said material information, and
- (c) generate processed information at said upper unit in accordance with said set of "output specifier" information processing a set of internal result information and external result information at said first lower unit which is the result of execution in accordance with said "others specifier" information.

4. A multi-unit information processing system according to claim 3, wherein at least one downward input means for said sub-structure is interfaced to an external device.

5. A multi-unit information processing system according to claim 3, wherein at least one upward output means for said sub-structure is interfaced to an external device.

6. A multi-unit information processing system according to claim 3, further comprising at least one material information bus connected to said material input means of each of said units and to an external device.

* * * * *